US005694521A

United States Patent [19]

Shlomot et al.

[11] Patent Number: 5,694,521

[45] Date of Patent: Dec. 2, 1997

[54] VARIABLE SPEED PLAYBACK SYSTEM

[75] Inventors: Eyal Shlomot, Irvine; Albert Achuan Hsueh, Laguna Niguel, both of Calif.

[73] Assignee: Rockwell International Corporation, Newport Beach, Calif.

[21] Appl. No.: 371,258

[22] Filed: Jan. 11, 1995

[51] Int. Cl.[6] .................................................... G01L 5/02

[52] U.S. Cl. ........................................ 395/2.71; 395/2.25

[58] Field of Search ..................... 381/34, 35; 395/2.76, 395/2.71, 2.25

[56] References Cited

U.S. PATENT DOCUMENTS

| | | | |
|---|---|---|---|
| 4,022,974 | 5/1977 | Kohut et al. | 179/1.5 M |
| 4,631,746 | 12/1986 | Bergeron et al. | 381/35 |
| 4,852,168 | 7/1989 | Sprague | 381/35 |
| 4,864,620 | 9/1989 | Bialick | 381/34 |
| 4,890,325 | 12/1989 | Taniguchi et al. | 381/34 |
| 4,935,963 | 6/1990 | Jain | 381/31 |
| 4,991,213 | 2/1991 | Wilson | 381/34 |
| 5,175,769 | 12/1992 | Hejna et al. | 381/34 |
| 5,327,498 | 7/1994 | Hamon | 381/51 |
| 5,341,432 | 8/1994 | Suzuki et al. | 381/34 |
| 5,386,493 | 1/1995 | Degen et al. | 395/2.76 |
| 5,479,564 | 12/1995 | Vogten et al. | 395/2.76 |

OTHER PUBLICATIONS

Sadaoki Furui and Mohan Sondhi, "Advances in Speech Signal Processing", Marcel Dekker, Inc.

National Communications System Office of Technology & Standards, "Telecommunications: Analog to Digital Conversion of Radio Voice by 4.800 Bit/Second Code Excited Linear Prediction (CELP)", Federal Standard 1016, Feb. 14, 1991, pp. 1–12.

National Communications System, "Technical Information Bulletin 92–1 Details to Assist in Implementation of Federal Standard 1016 CELP", Jan. 1992, pp. 1–35.

"Full–Rate Speech Codec Compatibility Standard PN–2972", TR45 Electronic Industries Association, 1990, pp. 1–64.

David Malah, Ronald E. Crochiere and Richard V. Cox, "Performance of Transform and Subband Coding Systems Combined with Harmonic Scaling of Speech", IEEE Transactions on Acoustics, Speech, and Signal Processing, vol. ASSP–29, No. 2, Apr. 1981, pp. 273–283.

Roucos et al., "High Quality Time–Scale Modification for Speech," Proc. ICASSP '86, pp. 493–496, 1986.

Wayman et al., "Some Improvements on the Synchronized–Overlap–Add Method of Time Scale Modification for Use in Real–Time Speech Compression and Noise Filtering," IEEE Transactions on ASSP, pp. 139–140, Jan. 1988.

Jianping, "Effective Time–Domain Method for Speech Rate–Change," IEEE Trans. on Consumer Electronics, pp. 339–346, May 1988.

"Methode de Modification de l'Echelle Temps of d' Enregistrements Audio, pour la Reecoute a Vitesse Variabel en Temps Reel," IEEE, 1993 Canadian Conference on Electrical and Computer Engineering, pp. 277–280, Sep. 1993.

*Primary Examiner*—Allen R. MacDonald
*Assistant Examiner*—Robert C. Mattson
*Attorney, Agent, or Firm*—William C. Cray; Susie H. Oh

[57] ABSTRACT

A variable speed playback system exploits multiple-period similarities within a residual signal, and includes multiple-period template matching which may be applied to alter the excitation periodical structure, and thereby increase or decrease the rate of speech playback. Embodiments of the present invention enable accurate fast or slow speech playback for store and forward applications without changing the pitch period of the speech. A correlated multiple-period similarity measure is determined for an excitation signal within a compressor/expander. The multiple-period similarity enables overlap-and-add expansion or compression by a rational ratio. Energy variations at the onset and offset portions of the speech may be weighted by energy-based adaptive weight windows.

34 Claims, 3 Drawing Sheets

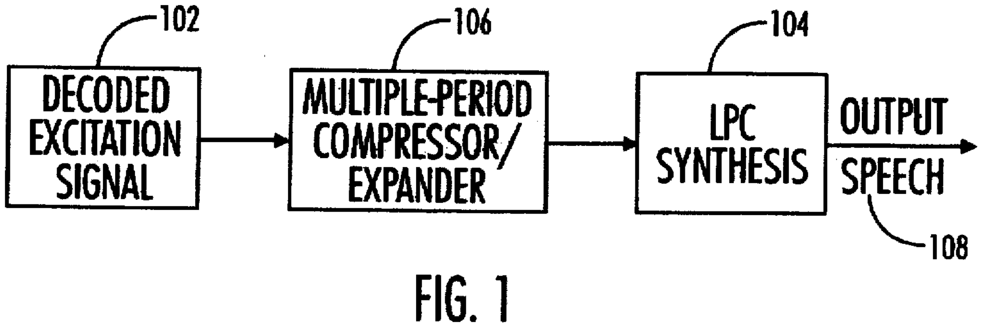
FIG. 1
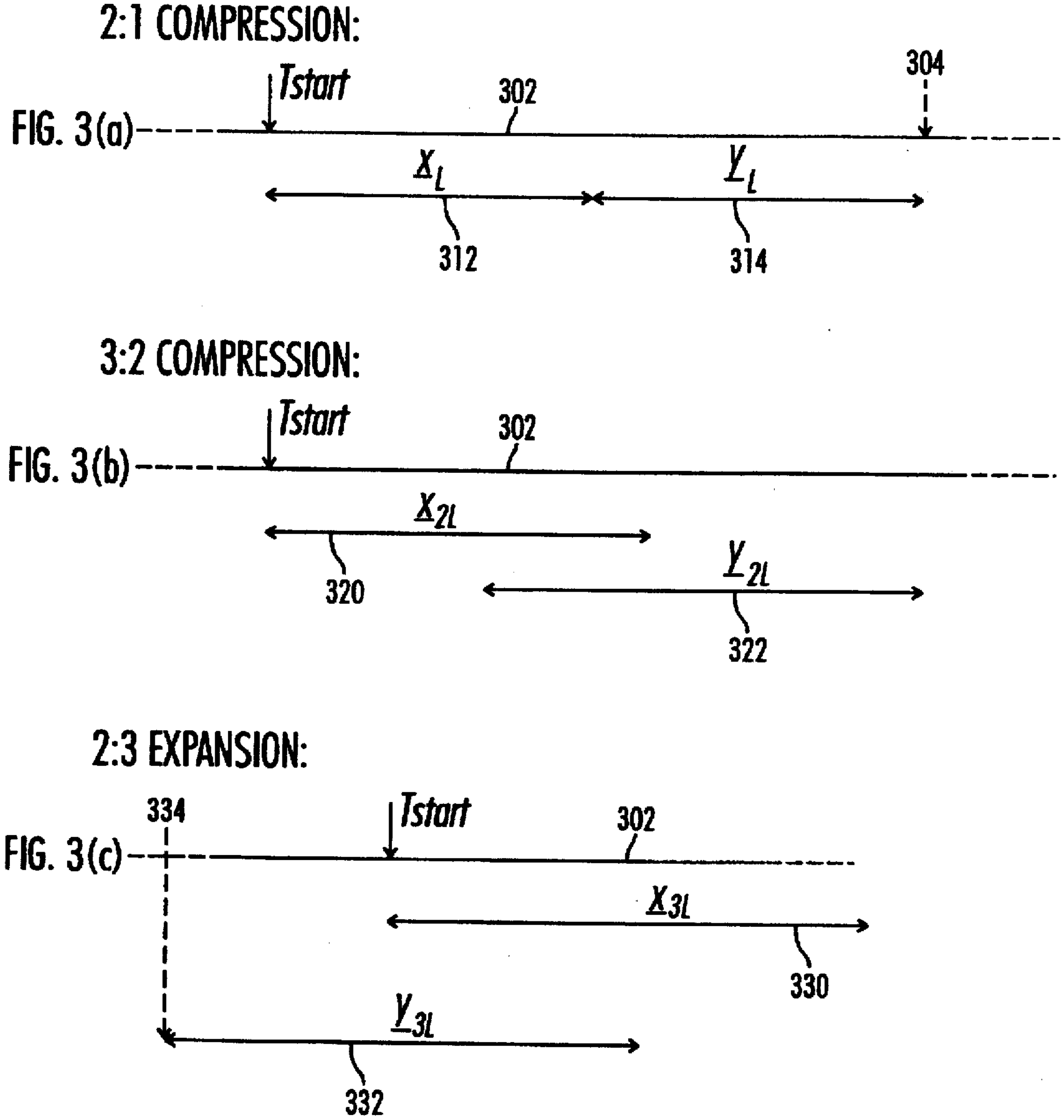

VARIABLE SPEED PLAYBACK SYSTEM

BACKGROUND OF THE INVENTION

1. Field of the Invention

The present invention relates to a combined speech coding and speech modification system. More particularly, the present invention relates to the manipulation of the periodical structure of speech signals.

2. Related Art

There is an increasing interest in providing digital store and retrieval systems in a variety of electronic products, particularly telephone products such as voice mall, voice annotation, answering machines, or any digital recording playback devices. More particularly, for example, voice compression allows electronic devices to store and playback digital incoming messages and outgoing messages. Enhanced features, such as slow and fast playback are desirable to control and vary the recorded speech playback.

Signal modeling and parameter estimation play increasingly important roles in data compression, decompression, and coding. To model basic speech sounds, speech signals must be sampled as a discrete waveform to be digitally processed. In one type of signal coding technique, called linear predictive coding (LPC), an estimate of the signal value at any particular time index is given as a linear function of previous values. Subsequent signals are thus linearly predictable according to earlier values. The estimation is performed by a filter, called LPC synthesis filter or linear prediction filter.

For example, LPC techniques may be reed for speech coding involving code excited linear prediction (CELP) speech coders. These conventional speech coders generally utilize at least two excitation codebooks. The outputs of the codebooks provide the input to the LPC synthesis filter. The output of the LPC synthesis filter can then be processed by an additional postfilter to produce decoded speech, or may circumvent the postfilter and be output directly.

Such coders has evolved significantly within the past few years, particularly with improvements made in the areas of speech quality and reduction of complexity. Variants of CELP coders have been generally accepted as industry standards. For example, CELP standards are described in Federal Standard 1016, Telecommunications: Analog to Digital Conversion of Radio Voice by 4,800 Bit/Second Code Excited Linear Prediction (CELP), National Communications System Office of Technology & Standards, Feb. 14, 1991, at 1–2; National Communications System Technical Information Bulletin 92-1, Details to Assist in Implementation of Federal Standard 1016 CELP, January 1992, at 8; and Full-Rate Speech Coded Compatibility Standard PN-2972, EIA/TIA Interim Standards, 1990, at 3–4.

In typical store and retrieve operations, speech modification, such as fast and slow playback, has been achieved using a variety of time domain and frequency domain estimation and modification techniques, where several speech parameters are estimated, e.g., pitch frequency or lag, and the speech signal is accordingly modified. However, it has been found that greater modified speech quality can be obtained by incorporating the speech modification device or scheme into a decoder, rather than external to the decoder. In addition, by utilizing template matching instead of pitch estimation, simpler and more robust speech modification is achieved. Further, energy-based adaptive windowing provides smoother modified speech.

SUMMARY OF THE INVENTION

The present invention is directed to a variable speed playback system incorporating multiple-period template matching to alter the LPC excitation periodical structure, and thereby increase or decrease the rate of speech playback, while retaining the natural quality of the speech. Embodiments of the present invention enable accurate fast or slow speech playback for store and forward applications.

A multiple-period similarity measure is determined for a decoded LPC excitation signal. A multiple-period similarity, i.e., a normalized cross-correlation, is determined. Expansion or compression of the time domain LPC excitation signal may then be performed according to a rational factor, e.g., 1:2, 2:3, 3:4, 4:3, 3:2, and 2:1. The expansion and compression are performed on the LPC excitation signal, such that the periodicity is not obscured by the formant structure. Thus, fast playback is achieved by combining N templates to M templates (N>M), and slow playback is obtained by expanding N templates to M templates (N<M).

More particularly, a; least two templates of the LPC excitation signal are determined according to a maximal normalized cross-correlation. Depending upon the desired ratio of expansion or compression, the templates are defined by one or more segments within the LPC excitation signal. Based on the energy ratios of these segments, two complementary windows are constructed. The templates are then multiplied by the windows, overlapped, and summed. The resultant excitation signal represents modified excitation signal, which is input into an LPC synthesis filter, to be later output as modified speech.

BRIEF DESCRIPTION OF THE DRAWINGS

FIG. 1 is a block diagram of a decoder incorporating an embodiment of a speech modification and playback system of the present invention.

FIG. 3 is a flow diagram of an embodiment of the speech modification scheme shown in FIGS. 1 and 2.

DETAILED DESCRIPTION OF THE PREFERRED EMBODIMENTS

The following description is of the best presently contemplated mode of carrying out the invention. In the accompanying drawings, like numerals designate like parts in the several figures. This description is made for the purpose of illustrating the general principles of the invention and should not be taken in a limiting sense. The scope of the invention is best determined by reference to the accompanying claims.

According to embodiments of the invention, and as will be discussed in greater detail below, an adaptive window-overlap-and-add technique for maximally correlated LPC excitation templates is utilized. The preferred template matching scheme results in high quality fast or slow playback of digitally-stored signals, such as speech signals.

Figure 2:
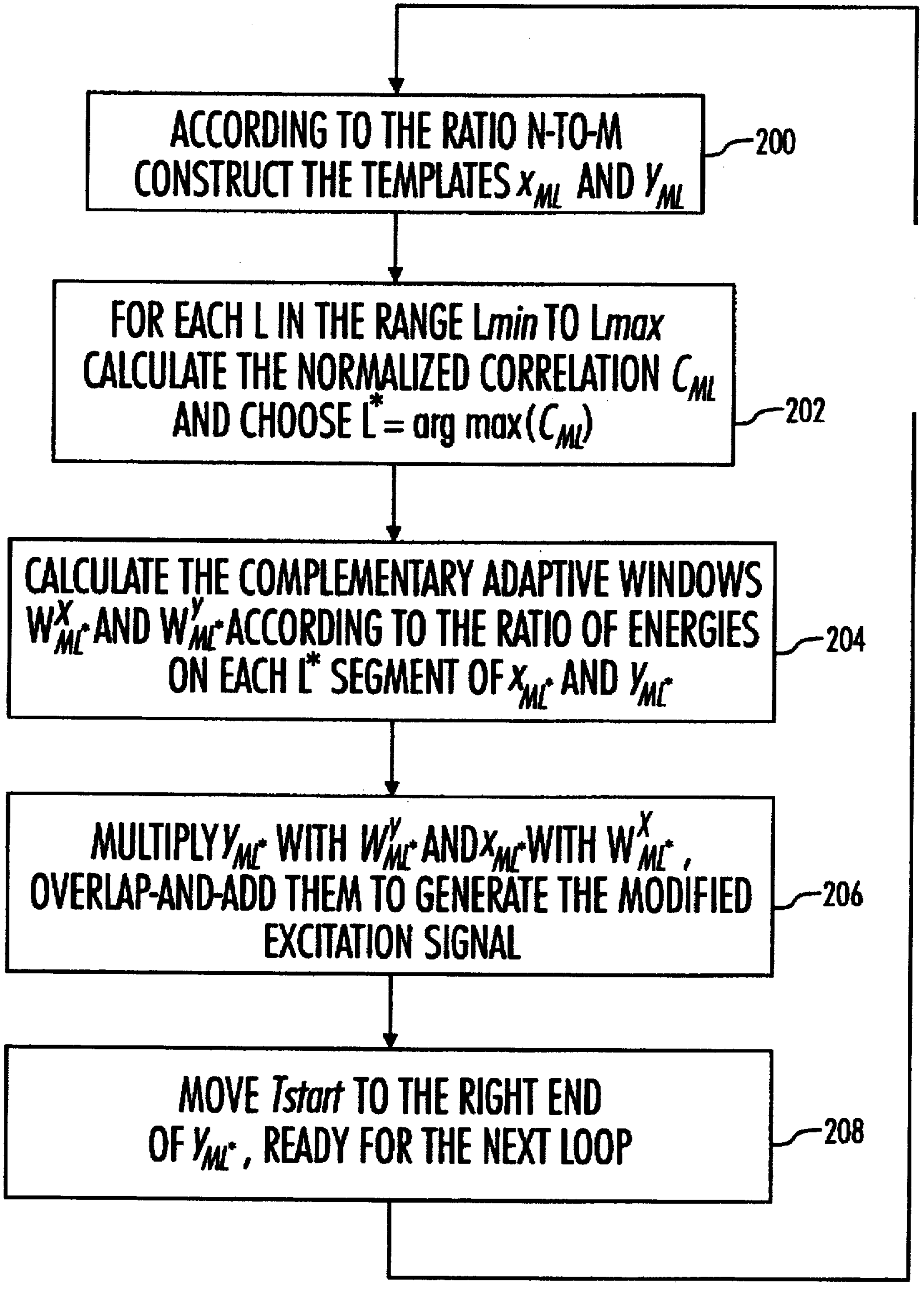
FIG. 2 illustrates speech compression and expansion according to the embodiment of FIG. 1.

As indicated in FIGS. 1 and 2, a decoded excitation signal 102 is sequentially processed from the beginning of a stored message to its end by a multiple-period compressor/expander 106. In the compressor/expander, two templates $X_{ML}$ and $y_{ML}$ are identified within the excitation signal 102 (step 200 in FIG. 2). The templates are formed of M segments. Accordingly, fast or slow playback is achieved by compressing or expanding, respectively, the excitation signal 302 in rational ratios of values N-to-M, e.g., 2-to-1, 3-to-2, 2-to-3, where M represents the resultant number of segments.

Referring to FIGS. 3(*a*), 3(*b*), and 3(*c*), Tstart indicates a dividing marker between the past, previously-processed portion of an excitation signal 302 (indicated as 102 in FIG. 1) and the remaining unprocessed portion. Thus, Tstart marks the beginning of the $X_{ML}$ template. At each stage, properly aligned templates $X_{ML}$ and $y_{ML}$ of the excitation signal 302 are correlated (step 202 in FIG. 2) for each possible integer value L between a minimum number Lmin to a maximum Lmax. The normalized correlation is given by:

$$C_{ML} = \frac{\left(\sum_{i=1}^{ML} x_{ML}(i)\cdot y_{ML}(i)\right)^2}{\left(\sum_{i=1}^{ML} x_{ML}^2(i)\right)\left(\sum_{i=1}^{ML} y_{ML}^2(i)\right)} \qquad \text{Eqn. (1)}$$

The value $L^*=\arg_L\max(C_{ML})$ can then be found by taking all possible values of L, e.g., Lmin=20 to Lmax=150, and calculating $C_{ML}$. A maximum $C_{ML}$ can then be determined for a particular value of L, indicated as $L^*$(step 202 in FIG. 2). Thus, $L^*$ represents the periodical structure of the excitation signal, and in most cases coincides with the pitch period. It will be recognized, however, that the normalized correlation is not confined to the usual frame structure used in LPC/CELP coding, and $L^*$ is not necessarily limited to the pitch period.

Referring to FIG. 2, two complementary adaptive windows of the size $ML^*$ are determined (step 204), $W^x_{ML^*}$ for $x_{ML^*}$ and $W^6_{ML^*}$ for $y_{ML^*}$. As described in more detail below, for complementary windows, the sum of the two windows equals 1 at every point. The adaptation is performed according to the energy ratio of each $L^*$ segment of $x_{ML^*}$ and $y_{ML^*}$. The templates $x_{ML^*}$ and $y_{ML^*}$ are multiplied by the complementary adaptive windows of length $ML^*$, overlapped, and then summed to yield the modified (fast or slow) excitation signal. (Step 206) The indicator Tstart is then moved to the right of $Y_{ML^*}$ (step 208), and points to the next part of the unprocessed excitation signal to be modified. The excitation signal can then be filtered by the LPC synthesis filter 104 (FIG. 1) to produce the decoded output speech 108.

1. The General Adaptive Windows Formulation

In this section, the general formulation of the adaptive windows is given. For any compression/expansion ratio of N-to-M, two complementary windows $W^x_{ML^*}$ and $W^y_{ML^*}$ are construction such that $W^x_{ML^*}(i)+W^y_{ML^*}(i)=1$ or $0 \leqq i < ML^*$. To improve the quality of the energy transitions in the modified speech, the windows are adapted according to the ratios of the energies between $x_{ML^*}$ and $y_{ML^*}$ on each $L^*$ segment.

More particularly, energies $E_y[k]$ (k=0, . . . , M−1) are calculated according to the following equations. It should be noted that in the energy equations, i=0 represents the beginning of the corresponding $x_{ML^*}$ and $y_{ML^*}$ segments.

$$E_y[k] = \sum_{i=kL^*}^{(k+1)L^*-1} y_{ML^*}^2(i)$$

The energies $E_x[k]$ (k=0, . . . , M−1) are calculated as:

$$E_x[k] = \sum_{i=kL^*}^{(k+1)L^*-1} x_{ML^*}^2(i).$$

And the ratios r[k] (k=0, . . . , M−1) are calculated by:

$$r[k] = \begin{cases} E_x[k]/E_y[k] & \text{if } E_x[k] \geqq E_y[k] > 0 \\ E_y[k]/E_x[k] & \text{if } 0 < E_x[k] < E_y[k] \end{cases}$$

such that a weighting function w[k] (k=0, . . . , M−1) is given as:

$$w[k] = \frac{2}{1+\sqrt{r[k]}}$$

where w[k]=0, for $E_x[k]*E_y[k]=0$.

Thus, for every k=0, . . . , M−1 and i=0, . . . , $L^*-1$, a window structure variable t can be defined as:

$$t(k,i) = \frac{kL^*+i}{ML^*}$$

Accordingly, the windows are determined as:

Fast playback $$W^x_{ML^*}(kL^*+i) = \begin{cases} 1 - w[k]\cdot t & \text{if } E_x[k] \geqq E_y[k] \\ w[k] - w[k]\cdot t & \text{if } E_x[k] < E_y[k] \end{cases}$$

$$W^y_{ML^*}(kL^*+i) = 1 - W^x_{ML^*}(kL^*+i) = \begin{cases} w[k]\cdot t & \text{if } E_x[k] \geqq E_y[k] \\ 1 - w[k] + w[k]\cdot t & \text{if } E_x[k] < E_y[k] \end{cases}$$

Slow playback $$W^x_{ML^*}(kL^*+i) = \begin{cases} 1 - w[k]\cdot t & \text{if } E_x[k] < E_y[k] \\ w[k] - w[k]\cdot t & \text{if } E_x[k] \geqq E_y[k] \end{cases}$$

$$W^y_{ML^*}(kL^*+i) = 1 - W^x_{ML^*}(kL^*+i) = \begin{cases} w[k]\cdot t & \text{if } E_x[k] < E_y[k] \\ 1 - w[k] + w[k]\cdot t & \text{if } E_x[k] \geqq E_y[k] \end{cases}$$

2. Fast Playback—Excitation Signal Compression

Referring to FIG. 3(*a*), data compression at a 2-to-1 ratio, for example, is achieved by combining the templates $x_L$ and $y_L$ into one template of length L. as can be seen in this example, M=1. Template $x_L$ 312 is defined by the L samples starting from Tstart, and $y_L$ is defined by the next segment of L samples. For each L in the range Lmin to Lmax, the normalized correlation $C_L$, is calculated according to Eqn. (1), where M=1, and $L^*$ is chosen as the value of L which maximizes the normalized correlation. The adaptive windows are then calculated following the equations described above for M=1.

Figure 4:
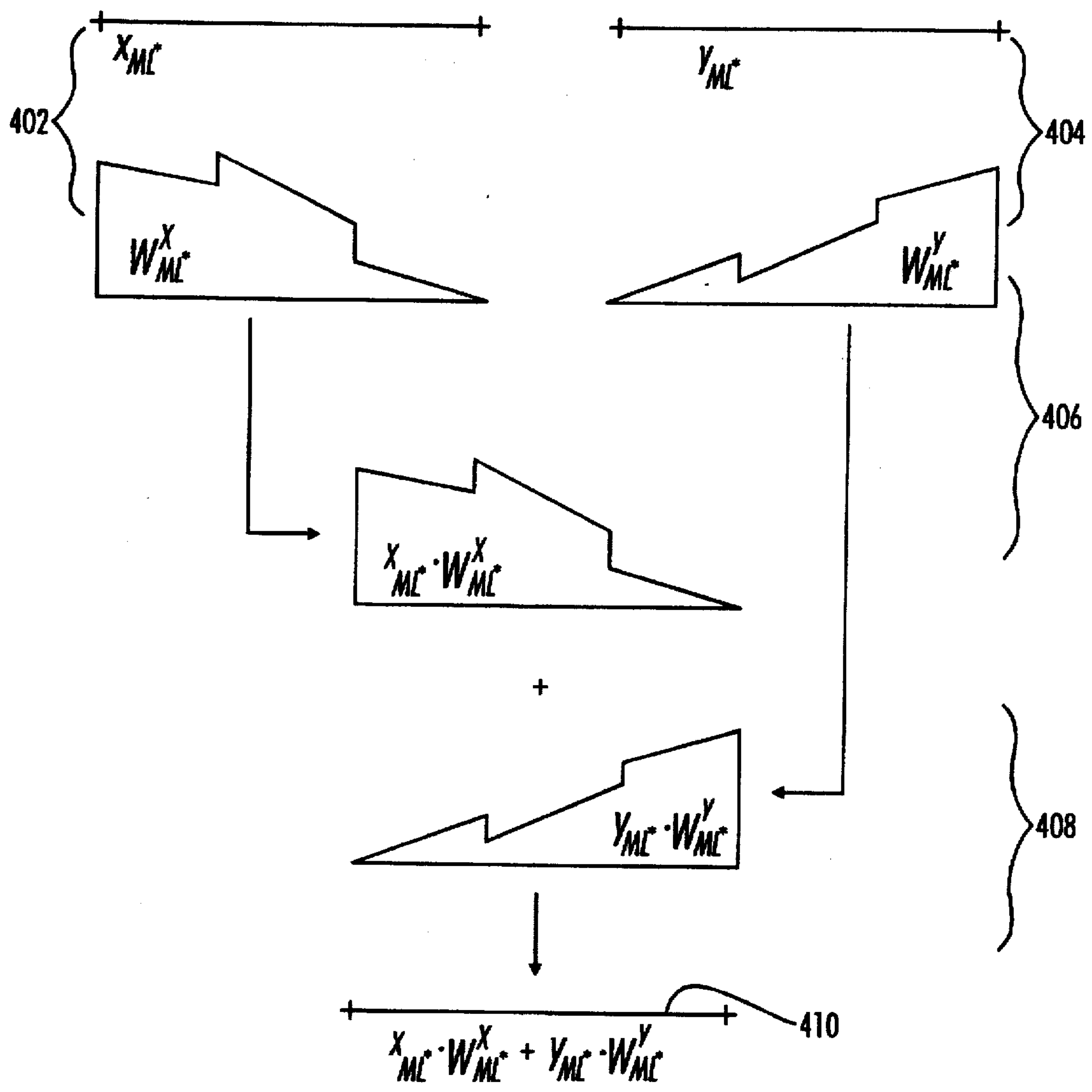
FIG. 4 shows an embodiment of window-overlap-and-add scheme of the present invention.

Accordingly, as illustrated generally in FIG. 4, $x_{L^*}$ is multiplied by $W^x_{L^*}$ (402) and $y_{L^*}$ is multiplied by $W^Y_{L^*}$ (404). The resulting signals are then overlapped (406) and summed (408), yielding the compressed excitation signal (410). As shown in FIG. 3(*a*), since two non-overlapped segments of $L^*$ samples each are combined into one segment of $L^*$ samples, 2-to-1 compression is achieved. Tstart can then be shifted to the end of $y_{L^*}$ (point 304 in FIG. 3(*a*)). The next template matching and combining loop can then be performed.

Referring to FIG. 3(*b*), data compression at a 3-to-2 ratio is achieved by combining templates $x_{2L}$ 320 and $y_{2L}$ 322 into one template of length 2L. Template $x_{2L}$ 320 is defined by a segment of 2 L samples starting at Tstart, and $y_{2L}$ is defined by 2L samples starting L samples subsequent to Tstart (i.e., to the right of Tstart in the figure). For each L in the range Lmin to Lmax, the normalized correlation $C_{2L}$ is calculated. The normalized correlation $C_{2L}$ is calculated by Eqn. (1) using M=2. Again, $L^*$ is chosen as the value of L which maximizes the normalized correlation. The adaptive windows are then calculated for M=2.

Again, as shown in FIG. 4, $x_{2L^*}$ is multiplied by $W^x_{2L^*}$ (402) and $y_{2L^*}$ is multiplied by $W^y_{2L^*}$ (404). The resultant signals are overlapped (406) and summed (408) to yield a 3-to-2 compressed excitation signal (410). In other words, the trailing end of the first segment $x_{2L}$ 320 is overlapped by the leading end of the next segment $y_{2L}$ 322, each having lengths of 2 $L^*$ samples, such that the overlapped amount is L samples long. Thus, Tstart can be moved to the end of $y_{2L^*}$ for the next template matching and combining loop.

3. Slow Playback—Excitation Signal Expansion

Referring to FIG. 3(*c*), data expansion at a 2-to-3 ratio is achieved by combining templates $x_{3L}$ 330 and $y_{3L}$ 332 into one template of length 3 L. The template $x_{3L}$ 330 is defined by 3 L samples starting from Tstart, and yes is defined by 3 L samples beginning at point 334, L samples before Tstart, representing previous excitation signals in time (i.e., to the left of Tstart). For each L in the range Lmin to Lmax, the normalized correlation $C_{3L}$ is calculated. The normalized correlation is determined according to Eqn. (1) using M=3, where $L^*$ is chosen to be the value of L which maximizes the normalized correlation. The adaptive windows are then calculated for M=3.

For the adaptive windowing, referring to the conceptual representation of FIG. 4, $x_{3L^*}$ is multiplied by $W^x_{3L^*}$ (402) and $y_{3L^*}$ is multiplied by $W^y_{3L^*}$ (404). The resultant signals are then overlapped (406) and summed (408), yielding the expanded excitation signal (410). As can be seen in FIG. 3(*c*), 2-to-3 expansion is achieved by overlapping in a reverse fashion. That is, the leading end of the $x_{ML}$ template is overlapped with the trig end of the $y_{ML}$ template such that the two segments, each of 3 $L^*$ samples, are overlapped by 2 $L^*$ samples, and combined into one segment of 3 $L^*$ samples. Tstart is then moved to the right end of $y_{3L^*}$, ready for the next template matching and combining loop. Thus, the excitation signal is expanded by selecting the particular placement of the $y_{ML}$ segment, and shifting the start point Tstart.

This detailed description is set forth only for purposes of illustrating examples of the present invention and should not be considered to limit the scope thereof in any way. It will be understood that various modifications, additions, or substitutions may be made without departing from the scope of the invention. Accordingly, it is to be understood that the invention is not to be limited by the specific illustrated embodiments, but only by the scope of the appended claims and equivalents thereof.

We claim:

1. A system for providing fast and slow speed playback capabilities, operable on a linear predictive coding (LPC) excitation signal which is represented by a waveform including periodic and non-periodic portions, comprising:

a signal compressor/expander for receiving and modifying the entire LPC excitation signal, wherein compression and expansion are performed according to a rational N-to-M ratio;

means for segregating at least one set of variable-length templates within the LPC excitation signal, each template defining at least one segment of time representing part of the waveform of the LPC excitation signal;

means for selecting a set of templates $X_{ML}$ and $y_{ML}$ having similar waveforms among the segregated variable-length templates, the selected set of templates including M segments of variable length L which provides a maximum amount of matching between $X_{ML}$ and $y_{ML}$, wherein the length of templates $X_{ML}$ and $y_{ML}$ is determined according to M multiplied by L which is not dependent upon the periodicity of the waveform;

means for compressing and expanding the LPC excitation signal for fast and slow playback, respectively, by overlapping and adding the selected set of templates $X_{ML}$ and $y_{ML}$ into at least one template having M segments, the M segments defining a modified excitation signal;

a filter for filtering the modified excitation signal; and output means for outputting the filtered signal.

2. The system of claim 1, further comprising means for calculating a correlation of each set of templates in accordance with the length of each template for determining the maximum amount of matching between $X_{ML}$ and $y_{ML}$.

3. The system of claim 2, wherein the correlation is normalized, such that the normalized correlation $C_{ML}$ of each set of templates is determined by:

$$C_{ML}=\frac{\left(\sum_{i=1}^{ML} x_{ML}(i)\cdot y_{ML}(i)\right)^2}{\left(\sum_{i=1}^{ML} x_{ML}^2(i)\right)\left(\sum_{i=1}^{L} y_{ML}^2(i)\right)}.$$

4. The system of claim 3, further comprising means for determining a value $L^*$ for which the normalized correlation among the sets of templates is maximized according to:

$$L^*=\arg_L\max(C_{ML})$$

such that templates $X_{ML^*}$ and $y_{ML^*}$ are selected according to the length $L^*$ of the templates for which the normalized correlation is maximized.

5. The system of claim 4, further comprising means for determining energy values of each corresponding segment k=0, . . . , M−1 in each template $X_{ML^*}$ and $y_{ML^*}$ according to:

$$E_y(k)=\sum_{i=kL^*}^{(k+1)L^*-1} y_{ML^*}^2(i)$$

$$E_x(k)=\sum_{i=kL^*}^{(k+1)L^*-1} x_{ML^*}^2(i).$$

6. The system of claim 5, further comprising means for calculating ratios of the energies of corresponding segments, wherein the ratios of the energies of corresponding segments are determined by:

$$r(k)=\begin{cases} E_x(k)/E_y(k) & \text{if } E_x(k)\geqq E_y(k)>0\\ E_y(k)/E_x(k) & \text{if } 0<E_x(k)<E_y(k).\end{cases}$$

7. The system of claim 6, further comprising means for determining weight coefficients of the ratios, for k=0, . . . , M−1, as represented by:

$$w(k)=\frac{2}{1+\sqrt{r(k)}}$$

where w(k)=0, for $E_x(k)^*E_y(k)=0$.

8. The system of claim 6, further comprising means for determining weight coefficients of the ratios of the energies.

9. The system of claim 8, further comprising means for determining preliminary window amplitudes according to the desired compression/expansion ratio, and the value of $L^*$.

10. The system of claim 8, further comprising means for constructing complementary windows according to the desired compression/expansion ratio, $L^*$, the weight coefficients, and the preliminary window amplitudes, wherein the complementary windows correspond to the selected templates $X_{ML}$ and $y_{ML^*}$.

11. The system of claim 7, further comprising means for determining preliminary window amplitudes according to the N-to-M ratio, which represents the desired compression/expansion ratio, and the value of $L^*$, wherein the preliminary window amplitude as given as:

$$t(i,k)=\frac{kL^*+i}{ML^*}$$

for $k=0, \ldots, M-1$ and $i=0, \ldots, L^*-1$.

12. The system of claim 11, further comprising means for constructing complementary windows according to the desired compression/expansion ratio, $L^*$, the weight coefficients, and the preliminary window amplitudes, wherein the complementary windows correspond to the selected templates $X_{ML^*}$ and $y_{ML^*}$, further wherein for fast playback the complementary windows are constructed according to:

$$W^x_{ML^*}(kL^*+i)=\begin{cases}1-w(k)\cdot t & \text{if } E_x(k)\geqq E_y(k)\\ w(k)-w(k)\cdot t & \text{if } E_x(k)<E_y(k)\end{cases}$$

$$W^y_{ML^*}(kL^*+i)=1-W^x_{ML^*}(kL^*+i)=\begin{cases}w(k)\cdot t & \text{if } E_x(k)\geqq E_y(k)\\ 1-w(k)+w(k)\cdot t & \text{if } E_x(k)<E_y(k)\end{cases}$$

and for slow playback, the complementary windows are constructed according to:

$$W^x_{ML^*}(kL^*+i)=\begin{cases}1-w(k)\cdot t & \text{if } E_x(k)<E_y(k)\\ w(k)-w(k)\cdot t & \text{if } E_x(k)\geqq E_y(k)\end{cases}$$

$$W^y_{ML^*}(kL^*+i)=1-W^x_{ML^*}(kL^*+i)=\begin{cases}w(k)\cdot t & \text{if } E_x(k)<E_y(k)\\ 1-w(k)+w(k)\cdot t & \text{if } E_x(k)\geqq E_y(k).\end{cases}$$

13. The system of claim 12, further comprising:
- means for multiplying the selected templates $X_{ML^*}$ and $y_{ML^*}$ with the complementary windows to provide windowed templates;
- means for overlapping the windowed templates; and
- means for summing the overlapped windowed templates, wherein the summed templates represent the modified LPC excitation signal.

14. A store and retrieve system for providing fast and slow speed playback capabilities, operable on a linear predictive coding (LPC) excitation signal including periodic and non-periodic portions, comprising:
- a signal compressor/expander for receiving and modifying the entire LPC excitation signal, wherein compression and expansion are performed according to a rational N-to-M ratio, the signal compressor/expander including:
  - means for selecting at least one set of templates within the LPC excitation signal, wherein each template in a set defines M segments of time which correspond to M segments in other templates within the set, wherein each segment has a variable length L,
  - means for calculating the normalized correlation of each set of templates, such that as L varies, the normalized correlations of the sets of templates correspondingly vary,
  - means for determining a value $L^*$ for which the normalized correlation among the sets of templates is maximized, such that an operational set of templates $X_{ML^*}$ and $y_{ML^*}$ is extracted, wherein the length of templates $X_{ML^*}$ and $y_{ML^*}$ is determined according to M multiplied by L which is not dependent upon the periodicity of the waveform,
  - means for determining an energy of each segment in each template,
  - means for calculating ratios of the energies of corresponding segments,
  - means for constructing complementary windows according to the N-to-M ratio, the value of $L^*$, and the ratios of the energies,
  - means for multiplying the operational set of templates with the complementary windows to provide windowed templates,
  - means for overlapping the windowed templates, and
  - means for summing the overlapped windowed templates, wherein the summed templates represent a modified LPC excitation signal;
- an LPC synthesis filter for receiving the modified LPC excitation signal, and filtering the modified LPC excitation signal to yield a modified speech signal; and
- means for outputting the modified speech signal.

15. The store and retrieve system of claim 14, wherein one or more corresponding segments of one template may overlap segments of the other templates within the set of corresponding templates.

16. The store and retrieve system of claim 14, wherein the operational set of templates includes two templates $X_{ML^*}$ and $y_{ML^*}$.

17. The store and retrieve system of claim 16, wherein the energy of each segment $k=0, \ldots, M-1$ of each template $X_{ML^*}$ and $y_{ML^*}$ is calculated according to:

$$E_y(k)=\sum_{i=kL^*}^{(k+1)L^*-1} y^2_{ML^*}(i)$$

$$E_x(k)=\sum_{i=kL^*}^{(k+1)L^*-1} x^2_{ML^*}(i).$$

18. The store and retrieve system of claim 17, wherein the energy ratios of the corresponding segments are determined by:

$$r(k)=\begin{cases}E_x(k)/E_y(k) & \text{if } E_x(k)\geqq E_y(k)>0\\ E_y(k)/E_x(k) & \text{if } 0<E_x(k)<E_y(k)\end{cases}$$

for $k=0, \ldots, M-1$.

19. The store and retrieve system of claim 18; further comprising means for determining weight coefficients of the energy ratios, for $k=0, \ldots, M-1$ as represented by:

$$w(k)=\frac{2}{1+\sqrt{r(k)}}$$

where w(k)=0, for $E_x(k)*E_y(k)=0$.

20. The store and retrieve system of claim 19, further comprising means for determining preliminary window amplitudes according to the N-to-M ratio and the value of $L^*$, wherein the preliminary window amplitude as given as:

$$t(k,i)=\frac{kL^*+i}{ML^*}$$

for k=0, . . . , M−1 and i=0, . . . , $L^*-1$.

21. The system of claim 20, wherein the complementary windows are constructed according to the N-to-M ratio, $L^*$, the weight coefficients, the calculated energies, and the preliminary window amplitudes, such that:

for fast playback, the complementary windows are constructed according to:

$$W^x_{ML^*}(kL^*+i)=\begin{cases}1-w(k)\cdot t & \text{if } E_x(k)\geqq E_y(k)\\ w(k)-w(k)\cdot t & \text{if } E_x(k)<E_y(k)\end{cases}$$

$$W^y_{ML^*}(kL^*+i)=1-W^x_{ML^*}(kL^*+i)=\begin{cases}w(k)\cdot t & \text{if } E_x(k)\geqq E_y(k)\\ 1-w(k)+w(k)\cdot t & \text{if } E_x(k)<E_y(k)\end{cases}$$

and for slow playback, the complementary windows are constructed according to:

$$W^x_{ML^*}(kL^*+i)=\begin{cases}1-w(k)\cdot t & \text{if } E_x(k)<E_y(k)\\ w(k)-w(k)\cdot t & \text{if } E_x(k)\geqq E_y(k)\end{cases}$$

$$W^y_{ML^*}(kL^*+i)=1-W^x_{ML^*}(kL^*+i)=\begin{cases}w(k)\cdot t & \text{if } E_x(k)<E_y(k)\\ 1-w(k)+w(k)\cdot t & \text{if } E_x(k)\geqq E_y(k).\end{cases}$$

22. A method for providing fast and slow speed playback capabilities, operable on a linear predictive coding (LPC) excitation signal including periodic and non-periodic portions, comprising the steps of:

receiving the LPC excitation signal;

modifying the entire LPC excitation signal, wherein compression and expansion are performed according to a rational N-to-M ratio, including the steps of:

selecting at least one set of templates within the LPC excitation signal, wherein each template in a set defines M segments of time which correspond to M segments in other templates within the set, wherein each segment has a variable length L, correlating each set of templates, such that as L varies, the correlations of the sets of templates correspondingly vary, determining a value $L^*$ for which the correlation among the sets of templates is maximized, such that an operational set of templates $X_{ML^*}$ and $y_{ML^*}$ is selected, wherein the length of templates $X_{ML^*}$ and $y_{ML^*}$ is determined according to M multiplied by L which is independent of the periodicity of the excitation signal, determining an energy of each segment in each template, calculating ratios of the energies of corresponding segments, constructing complementary windows according to the N-to-M ratio, the ratios of the energies, and $L^*$, multiplying the operational set of templates with the complementary windows to provide windowed templates, overlapping the windowed templates, and summing the overlapped windowed templates, wherein the summed templates represent a modified LPC excitation signal;

filtering the modified LPC excitation signal to yield a modified speech signal; and means for outputting the modified speech signal.

23. The method of claim 22, further comprising the step of determining weight coefficients of the energy ratios.

24. The method of claim 23, further comprising the step of determining preliminary window amplitudes according to the N-to-M ratio and the value of $L^*$.

25. The method of claim 24, wherein the complementary windows are constructed according to the N-to-M ratio, $L^*$, the weight coefficients, and the preliminary window amplitudes.

26. A system for providing fast and slow speed playback capabilities, operable on a linear predictive coding (LPC) excitation signal which is represented by a waveform, comprising:

a signal compressor/expander for receiving and modifying the LPC excitation signal, wherein compression and expansion are performed according to a rational N-to-M ratio, the signal compressor/expander including:

means for segregating at least one set of templates within the LPC excitation signal, each template defining at least one segment of time representing part of the waveform of the LPC excitation signal, selecting means for selecting a set of templates having similar waveforms, and combining means for compressing and expanding the LPC excitation signal for fast and slow playback, respectively, by combining the set of templates into a single template having M segments, which defines a modified excitation signal, wherein the combining means includes:

means for calculating a correlation $C_{ML}$ of each set of templates, wherein each set of templates includes two templates, the at least one segment defined in each template having a variable length L, and the two templates defining the at least one segment are represented as $X_{ML}$ and $y_{ML}$;

means for determining a value $L^*$ for which the correlation among the sets of templates is maximized according to:

$$L^* \arg_L \max(C_{ML}),$$

such that templates $X_{ML^*}$ and $y_{ML^*}$ are selected according to the length $L^*$ of the templates for which the correlation is maximized;

means for determining energy values of each corresponding segment in each template $X_{ML^*}$ and $y_{ML^*}$, wherein the energy values are calculated for each corresponding segment k=0, . . . , M−1 as:

$$E_y(k)=\sum_{i=kL^*}^{(k+1)L^*-1} y^2_{ML^*}(i)$$

-continued $$E_x(k) = \sum_{i=kL^*}^{(k+1)L^*-1} x^2_{ML^*}(i);$$

means for calculating ratios of the energies of corresponding segments, wherein the ratios of the energies of corresponding segments are determined by:

$$r(k) = \begin{cases} E_x(k)/E_y(k) & \text{if } E_x(k) \geqq E_y(k) > 0 \\ E_y(k)/E_x(k) & \text{if } 0 < E_x(k) < E_y(k), \end{cases}$$

means for determining and applying weight coefficients of the ratios, wherein the weight coefficients of the ratios, for k=0, . . . , M−1, are determined by:

$$w(k) = \frac{2}{1 + \sqrt{r(k)}}$$

where w(k)=0, for $E_x(k)^*E_y(k)=0$, a filter for filtering the modified excitation signal; and output means for outputting the filtered signal.

27. The system of claim 26, wherein the correlation of each set of templates is determined by:

$$C_{ML} = \frac{\left(\sum_{i=1}^{ML} x_{ML}(i) \cdot y_{ML}(i)\right)^2}{\left(\sum_{i=1}^{ML} x^2_{ML}(i)\right)\left(\sum_{i=1}^{L} y^2_{ML}(i)\right)}.$$

28. The system of claim 26, further comprising means for determining preliminary window amplitudes according to the N-to-M ratio, which represents the desired compression/expansion ratio, and the value of $L^*$, wherein the preliminary window amplitude as given as:

$$t(i,k) = \frac{kL^* + i}{ML^*}$$

for k=0, . . . , M−1 and i=0, . . . , $L^*$−1.

29. The system of claim 28, further comprising means for constructing complementary windows according to the desired compression/expansion ratio, $L^*$, the weight coefficients, and the preliminary window amplitudes, wherein the complementary windows correspond to the selected templates $X_{ML^*}$ and $y_{ML^*}$.

30. The system of claim 26, wherein for fast playback the complementary windows are constructed according to:

$$W^x_{ML^*}(kL^* + i) = \begin{cases} 1 - w(k) \cdot t & \text{if } E_x(k) \geqq E_y(k) \\ w(k) - w(k) \cdot t & \text{if } E_x(k) < E_y(k) \end{cases}$$

$$W^y_{ML^*}(kL^* + i) = 1 - W^x_{ML^*}(kL^* + i) = \begin{cases} w(k) \cdot t & \text{if } E_x(k) \geqq E_y(k) \\ 1 - w(k) + w(k) \cdot t & \text{if } E_x(k) < E_y(k) \end{cases}$$

and for slow playback, the complementary windows are constructed according to:

$$W^x_{ML^*}(kL^* + i) = \begin{cases} 1 - w(k) \cdot t & \text{if } E_x(k) < E_y(k) \\ w(k) - w(k) \cdot t & \text{if } E_x(k) \geqq E_y(k) \end{cases}$$

$$W^y_{ML^*}(kL^* + i) = 1 - W^x_{ML^*}(kL^* + i) = \begin{cases} w(k) \cdot t & \text{if } E_x(k) < E_y(k) \\ 1 - w(k) + w(k) \cdot t & \text{if } E_x(k) \geqq E_y(k). \end{cases}$$

31. The system of claim 29, further comprising:

means for multiplying the selected templates $X_{ML^*}$ and $y_{ML^*}$ with the complementary windows to provide windowed templates;

means for overlapping the windowed templates; and means for summing the overlapped windowed templates, wherein the summed templates represent the modified LPC excitation signal.

32. A store and retrieve system for providing fast and slow speed playback capabilities, operable on a linear predictive coding (LPC) excitation signal, comprising:

a signal compressor/expander for receiving and modifying the LPC excitation signal, wherein compression and expansion are performed according to a rational N-to-M ratio, the signal compressor/expander including:

means for selecting at least one set of templates within the LPC excitation signal, wherein each template in a set defines M segments of time which correspond to M segments in other templates within the set, wherein each segment has a variable length L, means for calculating the normalized correlation of each set of templates, such that as L varies, the normalized correlations of the sets of templates correspondingly vary, means for determining a value $L^*$ for which the normalized correlation among the sets of templates is maximized, such that an operational set of templates $X_{ML^*}$ and $y_{ML^*}$ is found, means for determining an energy of each segment in each template, means for calculating ratios of the energies of corresponding segments, means for determining weight coefficients of the energy ratios, wherein the weight coefficients of the energy ratios, for k=0, . . . , M−1, are determined by:

$$w(k) = \frac{2}{1 + \sqrt{r(k)}}$$

where w(k)=0, for $E_x(k)^*E_y(k)=0$.

means for determining preliminary window amplitudes according to the N-to-M ratio and the value of $L^*$, wherein the preliminary window amplitude as given as:

$$t(k,i) = \frac{kL^* + i}{ML^*}$$

for k=0, . . , M−1 and i=0, . . . $L^*$−1, means for constructing complementary windows according to the N-to-M ratio, the value of $L^*$, and the ratios of the energies, wherein the complementary windows are constructed according to the N-to-M ratio, $L^*$, the weight coefficients, the calculated energies, and the preliminary window amplitudes, such that for fast playback, the complementary windows are constructed according to:

$$W^x_{ML^*}(kL^*+i)=\begin{cases}1-w(k)\cdot t & \text{if } E_x(k)\geqq E_y(k)\\ w(k)-w(k)\cdot t & \text{if } E_x(k)<E_y(k)\end{cases}$$

$$W^y_{ML^*}(kL^*+i)=1-W^x_{ML^*}(kL^*+i)=\begin{cases}w(k)\cdot t & \text{if } E_x(k)\geqq E_y(k)\\ 1-w(k)+w(k)\cdot t & \text{if } E_x(k)<E_y(k)\end{cases}$$

and for slow playback, the complementary windows are constructed according to:

$$W^x_{ML^*}(kL^*+i)=\begin{cases}1-w(k)\cdot t & \text{if } E_x(k)<E_y(k)\\ w(k)-w(k)\cdot t & \text{if } E_x(k)\geqq E_y(k)\end{cases}$$

$$W^y_{ML^*}(kL^*+i)=1-W^x_{ML^*}(kL^*+i)=\begin{cases}w(k)\cdot t & \text{if } E_x(k)<E_y(k)\\ 1-w(k)+w(k)\cdot t & \text{if } E_x(k)\geqq E_y(k)\end{cases}$$

means for multiplying the operational set of templates with the complementary windows to provide windowed templates, means for overlapping the windowed templates, and means for summing the overlapped windowed templates, wherein the summed templates represent a modified LPC excitation signal;

an LPC synthesis filter for receiving the modified LPC excitation signal, and filtering the modified LPC excitation signal to yield a modified speech signal; and means for outputting the modified speech signal.

33. The system of claim 32, wherein the energy of each segment k=0, . . . , M−1 of template $X_{ML^*}$ and $y_{ML^*}$ is calculated according to:

$$E_y(k)=\sum_{i=kL^*}^{(k+1)L^*-1} y^2_{ML^*}(i)$$

$$E_x(k)=\sum_{i=kL^*}^{(k+1)L^*-1} x^2_{ML^*}(i).$$

34. The system of claim 33, wherein the ratios of the energies of corresponding segments is determined as:

$$r(k)=\begin{cases}E_x(k)/E_y(k) & \text{if } E_x(k)\geqq E_y(k)>0\\ E_y(k)/E_x(k) & \text{if } 0<E_x(k)<E_y(k)\end{cases}$$

for k=0, . . . , M−1.

* * * * *